United States Patent [19]

Ogawa

[11] 4,000,371
[45] Dec. 28, 1976

[54] FACSIMILE TRANSMISSION METHOD AND SYSTEM

[75] Inventor: Mutsuo Ogawa, Tokyo, Japan
[73] Assignee: Ricoh Co., Ltd., Tokyo, Japan
[22] Filed: Mar. 12, 1975
[21] Appl. No.: 557,552
[30] Foreign Application Priority Data
   Mar. 16, 1974  Japan .............................. 49-30180
[52] U.S. Cl. ................................ 179/2 DP; 178/3; 178/26 R; 179/4; 340/147 R
[51] Int. Cl.² .................. H04Q 5/00; H04M 11/06
[58] Field of Search ............ 179/3, 4, 2 DP, 84 VF; 340/147 R; 178/3, 2 R, 2 B, 2 A, 2 C, 2 D, 2 E, 4.1 R, 4.1 B, 4.1 C, 26 R, 26 A

[56] References Cited
UNITED STATES PATENTS

| | | | |
|---|---|---|---|
| 3,384,713 | 5/1968 | Duncan | 179/2 DP |
| 3,457,550 | 7/1969 | Gibson et al. | 179/2 DP |
| 3,609,241 | 9/1971 | Riethmeier | 179/4 |
| 3,739,338 | 6/1973 | Jacobson et al. | 179/4 |

Primary Examiner—Thomas A. Robinson
Attorney, Agent, or Firm—Frank J. Jordan

[57] ABSTRACT

Two facsimile devices, each capable of operating in a plurality of communication modes and having at least one common communication mode are connected together by a telephone line. One of the devices sends to the other a plurality of low and high group frequency signals arranged in a code designating the possible communication modes of the device. The other device receives the signals, determines from them a common communication mode based on its own possible communication modes in accordance with a priority arrangement, and sends high and low group frequency signals to the first device indicating the selected common communication mode so that both of the facsimile devices are set to the selected common communication mode prior to the transmission of graphic information.

4 Claims, 10 Drawing Figures

FACSIMILE TRANSMISSION METHOD AND SYSTEM

The present invention relates to an automatic answering facsimile transmission method and system in which two facsimile devices, each capable of operating in a plurality of communication modes, automatically communicate with each other to determine a communication mode common to both and set themselves to the common mode prior to the transmission of graphic information.

Recent developments in the art of facsimile transmission have enabled facsimile systems in which a plurality of facsimile devices are connected by public telephone lines. One device may be controlled to call another device either manually or automatically to initiate facsimile transmission.

Other innovations recently introduced are improved facsimile communication modes which greatly increase the speed of transmission. Communication modes currently available include:

1. Ultra-high speed run length encoding;
2. High speed skip scanning combined with three level analog compression;
3. Medium speed skip scanning (white lines) combined with simple modulation;
4. Medium speed three level analog compression; and
5. Low speed simple modulation.

It is also known in the art to provide a facsimile device operable in a high speed communication mode with means allowing it to alternatively operate in one or more lower speed communication modes at only slightly increased manufacturing cost. This is highly desirable in increasing the compatibility between various facsimile devices of different models which might be connected together by a public telephone network. Until the present time, however, although systems are available to provide automatic calling and answering between facsimile devices, means have not been provided for two facsimile devices operable in a plurality of communication modes to automatically select a common communication mode prior to the transmission of graphic information. It is generally necessary for the operators of both facsimile devices to verbally communicate with each other, decide a common communication mode, and manually set their respective facsimile devices to operate in the selected mode prior to the transmission of graphic information. This drawback is not only disadvantageous in that it is necessary to provide operators for both devices, but creates a waste of communication time which may be especially expensive in the case of long distance or overseas transmission.

It is therefore an important object of the present invention to provide a method of facsimile transmission in which two facsimile devices communicate with each other and automatically set themselves to a common communication mode prior to the transmission of graphic information.

It is another object of the present invention to provide a facsimile system embodying the above method.

It is another object of the present invention to provide a method of facsimile transmission in which codes indicated by combinations of high and low group frequency signals are transmitted between facsimile devices to indicate the communication modes in which the facsimile devices are operable.

The above and other objects, features and advantages of the present invention will become clear from the following detailed description taken with the accompanying drawings, in which.

Figures 1, 4:
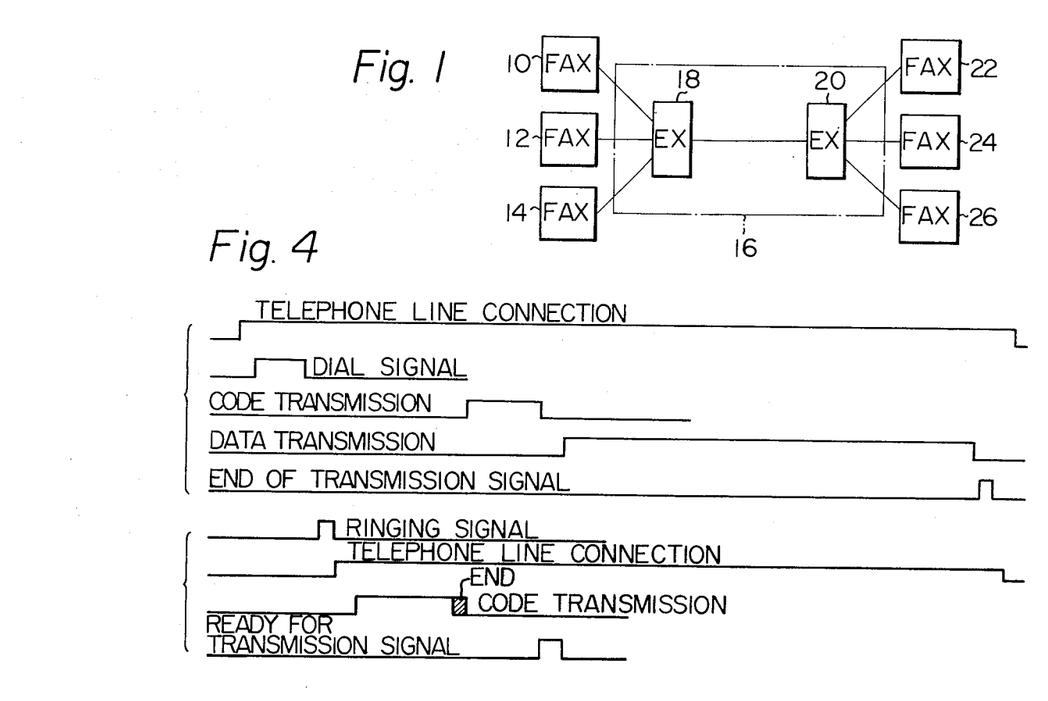
FIG. 1 is a block diagram of a facsimile system to which the present invention is applicable.
FIG. 4 is a timing diagram of the system shown in FIG. 1.

Referring now to FIG. 1, a facsimile system to which the present invention is applicable comprises a first set of facsimile devices (FAX) 10, 12 and 14 connected to an exchange (EX) 18 of a public telephone network 16. The exchange 18 is connected to another exchange 20 which in turn is connected to a second set of facsimile devices 22, 24 and 26. Each of the facsimile devices is operable in a plurality of communication modes as will be described in detail below.

The facsimile devices are similar to each other, but are operable in different combinations of communication modes. It will be assumed that at least one communication mode is common to all of the facsimile devices.

Figure 2:
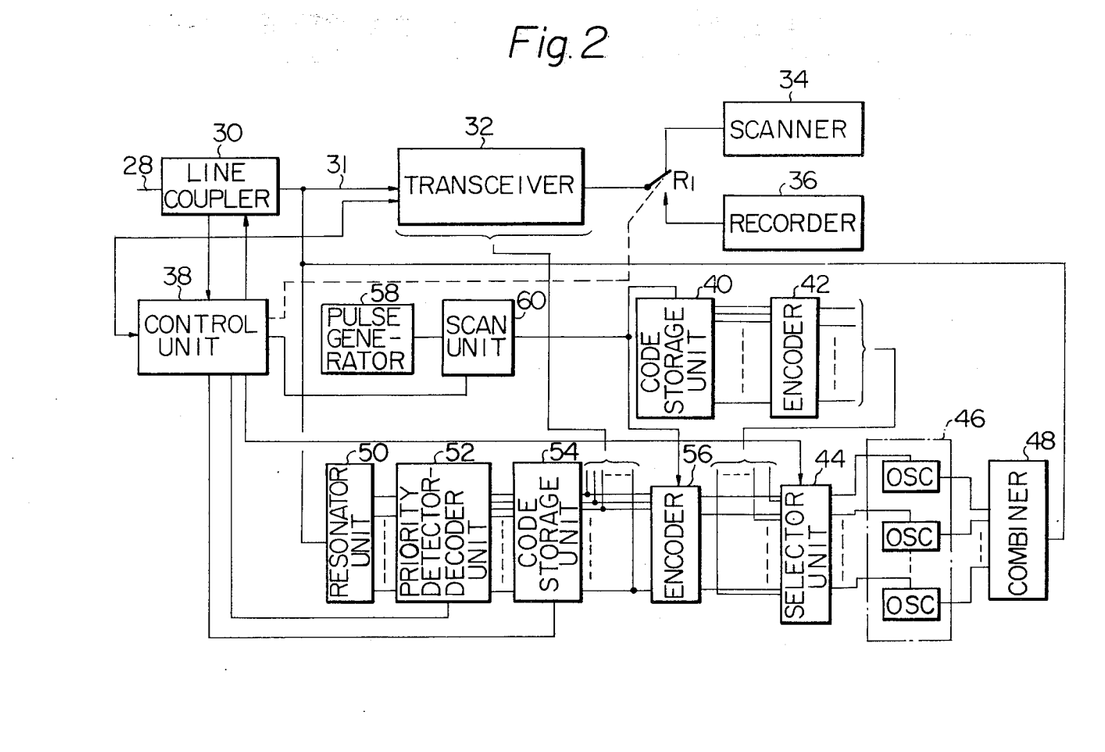
FIG. 2 is a block diagram of a facsimile device of a system embodying the present invention.

Referring now to FIG. 2, a typical one of the facsimile devices, for example the device 10, is shown in block form. A telephone line 28 is connected to the telephone network 16 is connected through a line coupler 30 and a line 31 to a facsimile transceiver 32. The transceiver 32 is normally connected to a scanner 34 through relay contacts R1, but energization of a relay (to be described below) changes the contacts R1 to connect the transceiver 32 to a recorder 36. The line coupler 30 is connected to a control unit 38 for cooperative control. The control unit 38 also controls the relay contacts R1 and transceiver 32.

A code representing the communication modes in which the facsimile device 10 is operable is set into and stored in a first code storage unit 40, which is connected through an encoder 42 to a switch or selector unit 44. The output of the selector unit 44 is connected through a code sending means comprising an oscillator unit 46 and a combiner 48 through the line 31 to the line coupler 30 which is connected to the telephone network 16.

The line coupler 30 is also connected through a resonator unit 50 and a priority sensing or detector-decoder unit 52 to a second code storage unit 54. The output of the code storage unit 54 is connected to the transceiver 32 to set the communication mode thereof. The code storage unit 54 is also connected through an encoder 56 to the selector unit 44. A pulse generator 58 is connected through a scanning unit 60 to the code storage unit 40 and encoder 56. The control unit 38 is further connected to control the scanning unit 60, selector unit 44, priority detector-decoder unit 52 and code storage unit 54.

The various facsimile communication modes and other information can be indicated in the form of a code comprising the digits 1 to 12, and converted into signals each comprising one of a low group frequency $f_1, f_2, f_3$ or $f_4$ and one of a high group frequency $f_5, f_6$ or $f_7$ as shown in the following table.

| Code | Frequency Low group | High group | Communication mode |
|---|---|---|---|
| 1 | f1 (Hz) | f5 (Hz) | Digital run length encoding |
| 2 | f1 | f6 | Skip scanning combined with three level analog compression |
| 3 | f1 | f7 | Skip scanning combined with simple modulation |
| 4 | f2 | f5 | Three level analog compression |
| 5 | f2 | f6 | Simple modulation |
| 6(Optional) | f2 | f7 | Line density 2.7 lines/mm |
| 7(Optional) | f3 | f5 | Line density 4 lines/mm |
| 8(Optional) | f3 | f6 | Line density 8 lines/mm |
| 9(Optional) | f3 | f7 | Paper size A-5 |
| 10(Optional) | f4 | f5 | Paper size A-4 |
| 11(Optional) | f4 | f6 | Multi-page transmission |
| 12 | f4 | f7 | Code transmission end |

The codes are considered as having a predetermined priority arrangement such that the priority sequentially decreases from code 1 to code 12. The combinations of frequencies representing the codes are transmitted in sequential order from those representing code 1 to those representing code 12 as will be understood from description to follow.

The overall operation of the system will now be described with reference to FIGS. 1, 2 and 4. One of the facsimile devices, for example the device 10, places a telephone call to another device, for example the device 22 for the purpose of transmitting graphic information to the device 22. The line coupler 30 of the calling device 10 connects the line 31 to the telephone network 16. The device 10 receives a dial tone (see FIG. 4) from the telephone network 16 and dials the number of the device 22. The device 22 receives a ringing signal which is applied through the line coupler 30 of the device 22 to the control unit 38. The control unit 38 controls the line coupler 30 to connect the line 31 of the device 22 to the network 16 and causes the relay contacts R1 to connect the transceiver 32 to the recorder 36. The control unit 38 of the device 22 then controls the scanning unit 60 to gate pulses from the gate pulse generator 58 to the code storage unit 40 and controls the selector unit 44 to connect the encoder 42 to the oscillator unit 46. The various communication modes in which the device 22 is operable have been manually entered into and stored in the code storage unit 40, and the scanning unit 60 scans the code storage unit 40 so that the codes representing the possible communication modes are sequentially fed to the encoder 42 in sequential order from code 1 to code 12. The output of the encoder 42 sequentially controls the oscillator unit 46 to generate the frequency signals indicating the possible modes. For example, if the device 22 is capable of operating in communication modes 3, 4, 5, 6, 7, 10 and 12, the result of the scanning operation of the scanning unit 60 is that the oscillator unit 46 will sequentially generate the following combinations of frequencies: f1 and f7, f2 and f5, f2 and f6, f2 and f7, f3 and f5, f4 and f5, f4 and f7 respectively. These frequency signals are fed through the combiner 48 and the line coupler 30 of the device 22 and the telephone network 16 to the device 10.

Figures 3, 3A:
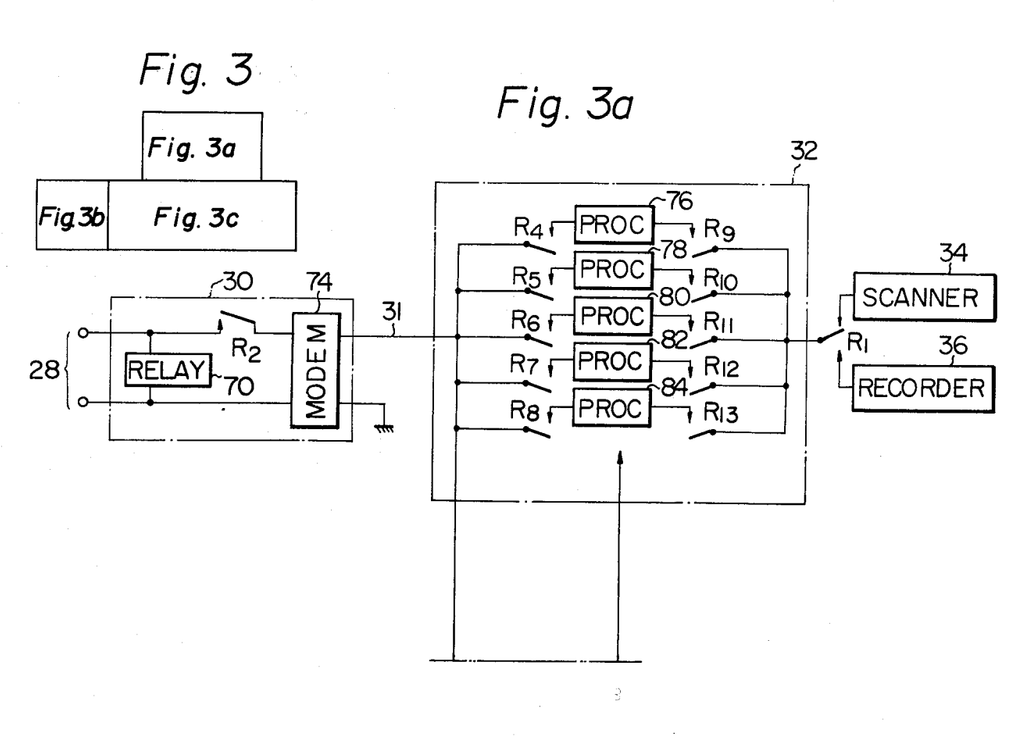
FIG. 3 is a block diagram illustrating the positional relationship of FIGS. 3a, 3b and 3c–1 to 3c–3.
Figure 3B:
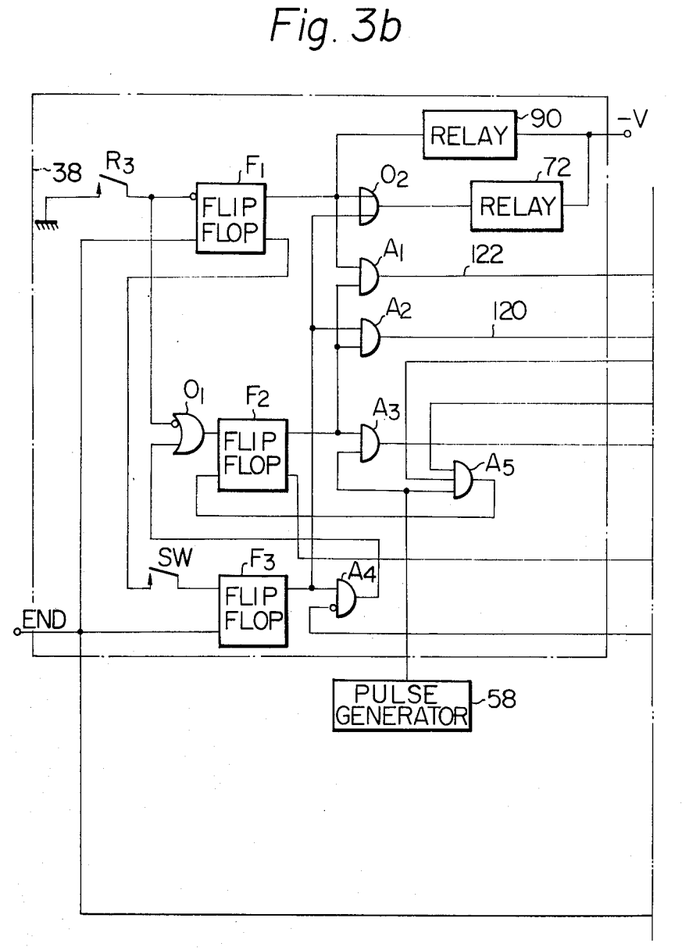
Figure 3C:
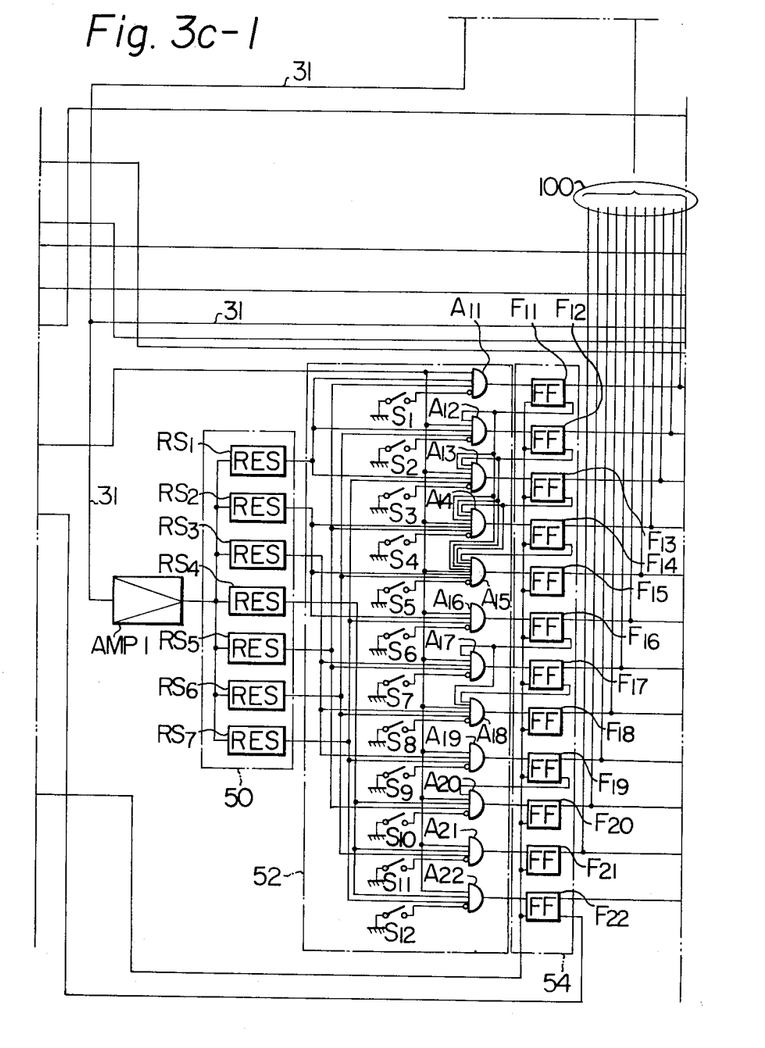

Since the device 10 is serving as the transmitter, its transceiver 32 is connected to its scanner 34 through the relay contacts R1. The signals from the device 22 are applied through the line coupler 30 of the device 10 to the resonator unit 50 thereof. The resonator unit 50 comprises seven resonators (see FIG. 3c-1) tuned to the frequencies f1 to f7 respectively which are connected to the priority detector-decoder unit 52. Various pairs of the resonators resonate as the various pairs of frequencies are applied thereto, and the pairs of frequencies are converted into the codes in the unit 52. The unit 52 will select whichever of the received codes 1 to 5 common to the device 10 has the highest priority, and set the selected code into the code storage unit 54 to set the transceiver 32 of the device 10 to operate in the selected communication mode. Optionally, one or more of the codes 6, 7 and 8 may be received indicating the possible line density modes of the device 22, and the unit 52 of the device 10 will select the code common to the device 10 with the highest priority and set the same into the code storage unit 54. One or more paper sizes may be similarly designated by the codes 9 and 10, as well as multi-page transmission by the code 11. When the code 12 indicating the end of code transmission is set into the code storage unit 54 of the device 22, a signal is fed therefrom to the control unit 38.

In response to the end signal from the code storage unit 54, the control unit 38 controls the selector unit 44 to connect the encoder 56 to the oscillator unit 46 and actuates the scanning unit 60. The scanning unit 60 scans the elements of the encoder 56 to feed the codes stored in the code storage unit 54 through the encoder 56 and selector unit 44 to the oscillator 46. It will be understood that the codes in the code storage unit 54 represent a selected communication mode (a combination of a scanning system, compression system, line density, paper size and multi-page capability) which is common to both of the devices 10 and 22 and has the highest priority. These codes are fed to the transceiver 32 of the device 10 as mentioned above, and are converted into the respective pairs of frequencies by the encoder 56 and oscillator unit 46 of the device 10. From the oscillator unit 46 of the device 10, the frequency signals are fed through the combiner 48, line coupler 30 and the telephone network 16 to the line coupler 30 of the device 22.

The signals are fed through the line coupler 30 of the device 22 to the resonator unit 50 thereof, which resonates in response to the respective pairs of frequencies. The output of the resonator unit 50 is decoded by the priority detector-decoder unit 52, and the resulting codes representing the selected communication mode are set into the code storage unit 54 from which they are fed to the transceiver 32 to set the same to the selected communication mode. In this case, the unit 52 is not required to function as a priority detector since the priorities were set by the unit 52 of the device 10. As the result of the above described operations, a communication mode which is common to both of the devices 10 and 22 is determined, and both of the devices 10 and 22 are set to said communication mode.

Subsequently, means not shown in the device 22 feeds a ready for transmission signal to the device 10, which transmits the graphic information to the device 22 in response thereto. After graphic information transmission is finished, means not shown in the device 10 sends to the device 22 an end of transmission signal, and means not shown disconnect both of the devices 10 and 22 from the telephone network 16.

The facsimile device 10 shown in FIG. 2 is shown in greater detail in FIGS. 3a, 3b and 3c-1 to 3c-3. The line coupler 30 comprises a relay 70 connected to the telephone line 28 and arranged to control relay contacts R3 in the control unit 38. Relay contacts R2 controlled by a relay 72 in the control unit 38 are connected between the telephone line 28 and a modem 74. The line 31 leads from the modem 74 through relay contacts R4 to R8 to processors 76, 78, 80, 82 and 84 respectively. The processor 76 is for digital run length encoding, the processor 78 for skip scanning combined with three level analog compression, the processor 80 for skip scanning combined with simple modulation, the processor 82 for three level analog compression and the processor 84 for simple modulation. The processors 76 to 84 are connected through relay contacts R9 to R13 respectively to the relay contacts R1.

In the control unit 38, the relay contacts R3 are connected between ground and an inverting set input of a receiving mode flip-flop F1. The relay contacts R3 are also connected between ground and an inverting input of an OR gate O1. The output of the OR gate O1 is connected to the set input of a scanning mode flip-flop F2. The "O" side output of the flip-flop F1 is connected through a call switch SW to the set input of a transmission mode flip-flop F3. The "1" output of the flip-flop F1 is connected to inputs of an OR gate O2 and a receiving mode AND gate A1. The "1" side output of the flip-flop F1 is also connected through a relay 90 arranged to control the relay contacts R1 to a negative voltage source −V. The output of the OR gate O2 is connected through the relay coil 72 which is arranged to control the relay contacts R2 to the source −V.

The "1" side output of the flip-flop F2 is connected to inputs of the AND gate A1, a transmission mode AND gate A2 and a scanning mode AND gate A3. The "1" side output of the flip-flop F3 is connected to inputs of the OR gate O2 and the AND gate A2.

The "1" side output of the flip-flop F3 is also connected to an input of an AND gate A4, the output of which is connected to an input of the OR gate O1. The output of the pulse generator 58 is connected to inputs of the AND gate A3 and an AND gate A5. The output of the AND gate A5 is connected to the reset input of the flip-flop F2.

The resonator unit 50 comprises seven resonators RS1 to RS7 tuned to resonate at the frequencies $f1$ to $f7$ respectively. The line 31 from the line coupler 30 is connected through an amplifier AMP1 to the inputs of the resonators RS1 to RS7. The priority detector-decoder unit 52 comprises 12 AND gates A11 to A22 and 12 switches S1 to S12 connected between ground and inverting inputs of the AND gates A11 to A22 respectively. The switches S1 to S12 represent the communication codes 1 to 12 respectively. The outputs of the AND gates A11 to A22 are connected to the set inputs of flip-flops F11 to F22 respectively constituting the code storage unit 54. The "1" side outputs of the flip-flops F11 to F22 are connected through lines collectively designated as 100 to the transceiver 32. Through relays (not shown for simplicity of illustration) in the transceiver 32, when the "1" side outputs of the flip-flops F11 to F15 are logically high, the relay contacts R4 and R9, R5 and R10, R6 and R11, R7 and R12, R8 and R13 are closed to energize or select the processors 76, 78, 80, 82 and 84 respectively. The outputs of the flip-flops F16 to F21 are connected to set the communication mode of the transceiver 32 although the means for performing the function are omitted for simplicity of illustration.

The "O" side output of the flip-flop F2 is connected to inputs of all of the AND gates A11 to A22. The "O" side output of the flip-flop F22 is connected to an inverting input of the AND gate A4. A terminal END is connected to the reset inputs of the flip-flops F1, F3 and F11 to F22.

Inputs of the AND gate A11 are connected to resonators RS1 and RS5 corresponding to the code 1. Inputs of the AND gate A12 are connected to outputs of the resonators RS1 and RS6 corresponding to the code 2 and also to the "O" side output of the flip-flop F11. Inputs of the AND gate A13 are connected to outputs of the resonators RS1 to RS7 corresponding to code 3 and also to the "O" side outputs of the flip-flops F11 and F12. Inputs of the AND gate A14 are connected to the outputs of the resonators RS2 and RS5 corresponding to the code 4 and to the "O" side outputs of the flip-flops F11 to F13. Inputs of the AND gate A15 are connected to outputs of the resonators RS2 and RS6 corresponding to the code 5 and to the "O" side outputs of the flip-flops F11 to F14. Inputs of the AND gate A16 are connected to the outputs of the resonators RS2 and RS7 corresponding to the code 6. Inputs of the AND gate A17 are connected to the outputs of the resonators RS3 and RS5 corresponding to the code 7 and also to the "O" side output of the flip-flop F16. Inputs of the AND gate A18 are connected to the outputs of the resonators RS3 and RS6 corresponding to the code 8, and also to the "O" side outputs of the flip-flops F16 and F17. Inputs of the AND gate A19 are connected to the outputs of the resonators RS3 and RS7 corresponding to the code 9. Inputs of the AND gate A20 are connected to the outputs of the resonators RS4 and RS5 corresponding to the code 10 and also to the "O" side output of the flip-flop F19. Inputs of the AND gate A21 are connected to the outputs of the resonators R4 and R6 corresponding to the code 11. Inputs of the AND gate A22 are connected to the outputs of the resonators R4 and R7 corresponding to the code 12. The priority function is provided since the AND gates A12 to A15 will be enabled only if the "O" side outputs of the flip-flops F11 to F14 respectively are logically high indicating that the communication modes represented by the lower numbered codes are not available. A similar function is provided for the line density codes 6, 7 and 8 and the paper size codes 9 and 10.

The output of the AND gate A3 is connected to the count input of a 5 digit counter 102 of the scanning unit 60. The carry output of the counter 102 is connected to the count input of a 4 digit counter 104. The outputs of the counters 102 and 104 are connected to inputs of decoders 106 and 108 respectively, the outputs of which are connected to lines 111 to 117. The combination of the counters 102 and 104 and the decoders 106 and 108 is arranged to produce logically high outputs on the lines 111 to 117 in response to pulses from the gate pulse generator 58 in a manner which will be described below in the following sequence: 111 and 115, 112 and 115, 113 and 115, 114 and 115, 111 and 116, 112 and 116, 113 and 116, 114 and 116, 111 and 117, 112 and 117, 113 and 117, 114 and 117 corresponding to the codes 1 to 12 respectively. It will be noted that this arrangement is different from the arrangement of the frequencies $f1$ to $f7$ corresponding to the codes 1 to 12. The lines 114 and 117 are connected to inputs of the and gate A5.

Figure 3C:
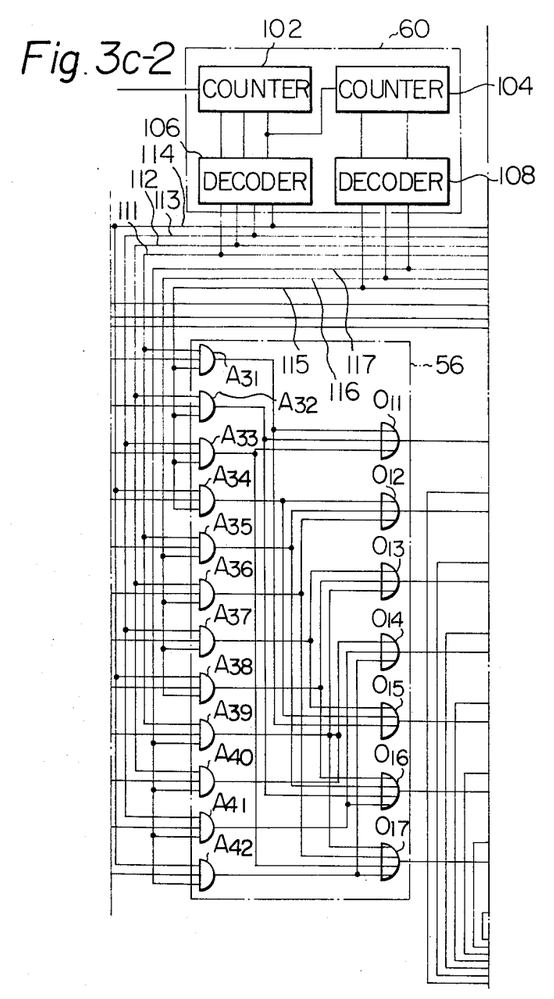

The encoder 56 comprises twelve AND gates A31 to A42 having inputs connected to the "1"side outputs of the flip-flops F11 to F22 respectively. The AND gates A31 to A42 also have inputs connected to the lines 111 and 115, 112 and 115, 113 and 115, 114 and 115, 111 and 116, 112 and 116, 113 and 116, 114 and 116, 111 and 117, 112 and 117, 113 and 117, 114 and 117 respectively. The AND gates A31 to A42 correspond to the codes 1 to 12 respectively, and are sequentially enabled by the scanning unit 60 through the lines 111 to 117 to sequentially gate the contents of the flip-flops F11 to F22 respectively therethrough.

The encoder 56 further comprises four OR gates O11 to O14 corresponding to the low group frequencies $f1$ to $f4$ and three OR gate O15 to O17 corresponding to the three high group frequencies $f5$ to $f7$ respectively. Inputs of the OR gate O11 are connected to the outputs of the AND gates A31, A32 and A33. Inputs of the OR gate O12 are connected to the outputs of the AND gates A34, A35 and A36. Inputs of the OR gate O13 are connected to the outputs of the AND gates A37, A38 and A39. Inputs of the OR gate O14 are connected to the outputs of the AND gates A40, A41, and A42. Inputs of the OR gate O15 are connected to the outputs of the AND gates A31, A34, A37 and A40. Inputs of the OR gate O16 are connected to the outputs of the AND gates A32, A35, A38 and A41. Inputs of the OR gate O17 are connected to the outputs of the AND gates A33, A36, A39 and A42. The decoding function is provided such that when the outputs of the AND gates A31 to A42 are logically high, the OR gates O11 to O17 will produce logically high outputs in the following combinations: O11 and O15, O11 and O16, O11 and O17, O12 and O15, O12 and O16, O12 and O17, O13 and O15, O13 and O17, O14 and O15, O14 and O16, O14 and O17 corresponding to the codes 1 to 12 respectively.

Figures 3C, 3C:
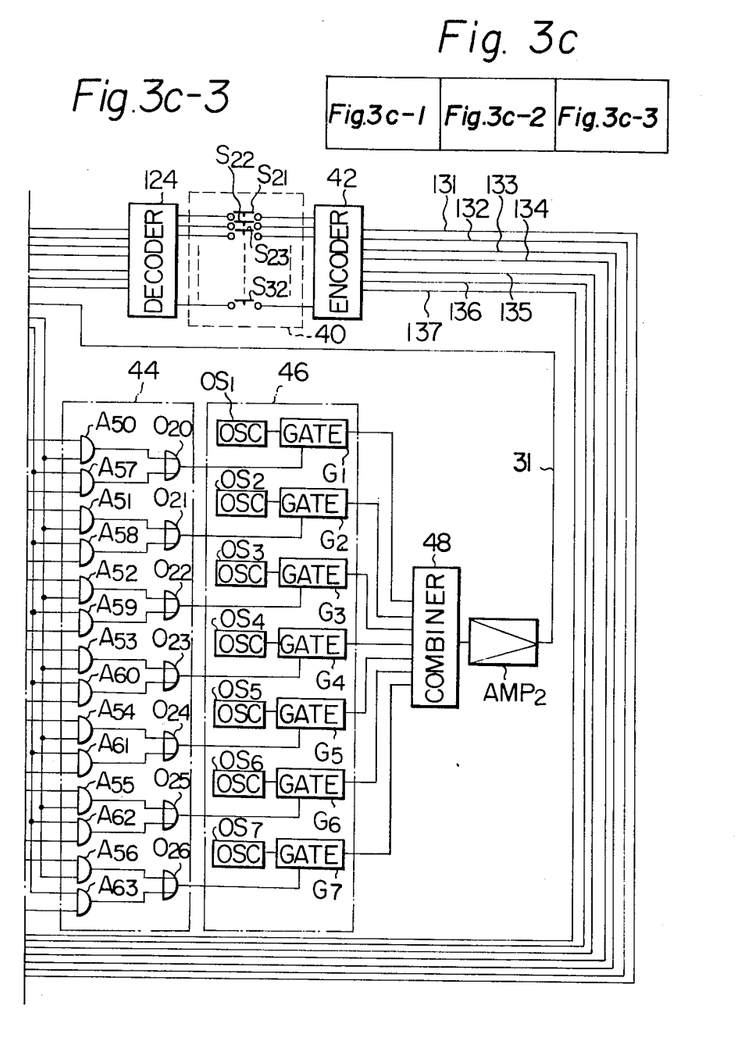

The selector unit 44 comprises seven AND gates A50 to A56 having inputs connected to the outputs of the OR gates O11 to O17 respectively. Other inputs of the OR gates A50 to A56 are connected to the outputs of the transmission mode AND gate A2 through a line 120. The outputs of the AND gates A50 to A56 are connected to inputs of OR gates O20 to O26 respectively.

The lines 111 to 117 from the scanning unit 60 are connected to a decoder 124. Twelve outputs of the decoder 124 are connected through the code storage unit 40 consisting of twelve switches S21 to S32 (only four are shown for simplicity of illustration) which are ganged to the switches S1 to S12 of the priority detector-decoder unit 52 respectively to twelve inputs of the encoder 42. The encoder 42 produces four outputs on lines 131 to 134 corresponding to the low group frequencies $f1$ to $f4$ which are connected to inputs of AND gates A57 to A60 respectively. The encoder 126 further produces outputs on lines 135, 136 and 137 corresponding to the high group frequencies $f5$, $f6$ and $f7$ which are connected to inputs of AND gates A61, A62 and A63 respectively. Other inputs of the AND gates A57 to A63 are connected to the output of the receiving mode AND gate A1 through a line 122. The outputs of the AND gates A57 to A63 are connected to inputs of the OR gates O20 to O26 respectively.

The decoder 124 comprises twelve AND gates which are identical to the AND gates A31 to A42 of the encoder 56 and are not shown for simplicity of illustration. The outputs of the AND gates of the decoder 124 are connected to the switches S21 to S32 respectively, which are closed to designate the communication modes in which the facsimile device 10 is operable together with the switches S1 to S12 of the unit 52. The encoder 42 comprises seven OR gates (not shown) identical to the OR gates O11 to O17 of the encoder 56 having inputs connected to the switches A21 to S32 and outputs connected to the lines 131 to 137. The operation of the scanning unit 60 in conjunction with the decoder 124 and encoder 42 is identical to that of the scanning unit 60 in conjunction with the encoder 56 except that the encoder 42 will not produce outputs corresponding to switches S21 to S32 which are open indicating that the facsimile device 10 is not operable in the communication modes corresponding to the respective codes 1 to 12.

The resonator unit 46 comprises seven oscillators OS1 to OS7 arranged to oscillate at the frequencies $f1$ to $f7$ and are connected through gates G1 to G7 respectively to the inputs of the combiner 48. The output of the combiner 48 is connected through an amplifier AMP2 and the line 31 to the line coupler 30. The outputs of the OR gates O20 to O26 are connected to control inputs of the gates G1 to G7 respectively.

The operation of the facsimile system will become more clear from the following detailed description with reference to the drawings, especially FIGS. 3a, 3b and 3c-1 to 3c-3. It will again be assumed that the device 10 is to communicate with a similar device 22 at a remote location through the telephone network 16, that the device 10 is to transmit graphic information and that the device 22 is to receive the graphic information. It will further be assumed that the device 10 is a low cost model and is only operable in communication modes 3, 4, 5, 7, 10 and 12. The device 22 is a better model and is operable in communication modes 2, 3, 4, 5, 6, 7, 9, 10, 11 and 12. Prior to placing the devices 10 and 22 in service, the operator of the device 10 closes the switches 3 and 23, 4 and 24, 5 and 25, 7 and 27, 10 and 30 and 12 and 32. The operator of the device 22 closes the switches S2 and S22, S3 and S23, S4 and S24, S5 and S25, S6 and S26, S7 and S27, S9 and S29, S10 and S30, S11 and S31 and S12 and S32. Means not shown in the devices 10 and 22 apply a signal to the terminals END and the flip-flops F1, F2, F3 and F11 to F22 are reset to the logically low state in both devices 10 and 22.

At the device 10 the operator momentarily closes the switch SW which, since the "O" side output of the flip-flop F1 is logically high, sets the flip-flop F3 to the logically high state. The high "1" side output of the flip-flop F3 is gated through the OR gate O2 and energizes the relay 72 which closes the relay contacts R2 connecting the device 10 to the telephone network 16. When a dial signal is received at the device 10, either the operator or an automatic dialing means (not shown) dials the telephone number of the device 22.

At the device 22, a ringing signal is applied to the line coupler 30 energizing the relay 70 which closes the relay contacts R3. This causes the flip-flops F1 and F2 to be set to the logically high state. The high "1" side output of the flip-flop F1 energizes the relay 90 which moves the relay contacts R1 to connect the transceiver 32 to the recorder 36. It will be noted that at the device 10, the relay 90 is not energized and the relay contacts R1 connect the transceiver 32 to the scanner 34.

Referring again to the device 22, closure of the relay contacts R3 sets the flip-flop F2 to the logically high state, since the inverting input of the OR gate O1 is grounded and the OR gate O1 thereby applies a high output to the set input of the flip-flop F2. The low "O" side output of the flip-flop F2 inhibits the AND gates A11 to A22 of the unit 52. The high "1" side outputs of the flip-flops F1 and F2 are applied to the receiving mode AND gate A1 which produces a high output on the line 122 to enable the AND gates A57 to A63 of the selector unit 44 and connect the encoder 42 to the resonator unit 46. The transmitting mode AND gate A2 produces a low output on the line 120 to inhibit the AND gates A50 to A56 of the selector unit 44 to disconnect the encoder 56 from the resonator unit 46 since the AND gate A2 is inhibited by the low "1" side output of the flip-flop F3.

The high "1" side output of the flip-flop F2 enables the AND gate A3 which gates pulses from the pulse generator 58 to the scanning unit 60 incrementing the counters 102 and 104 to sequentially produce high outputs on the lines 111 to 117 as described above which are applied to the decoder 124. Due to the configuration of the switches S21 to S32, the encoder 42 produces high outputs on the lines 131 to 137 in the following sequence: 132 and 135, 133 and 135, 134 and 135, 131 and 136, 132 and 136, 133 and 136, 131 and 137, 132 and 137, 133 and 137, 134 and 137. These outputs enable the AND gates A57 to A63 and the gates G1 to G7 in a manner described above so that the outputs of the oscillators OS1 to OS7 are gated to the combiner 48 to feed the following sequence of signals corresponding to the codes 2, 3, 4, 5, 6, 7, 9, 10, 11 and 12 to the line coupler 30: $f1$ and $f6$, $f1$ and $f7$, $f2$ and $f5$, $f2$ and $f6$, $f2$ and $f7$, $f3$ and $f5$, $f3$ and $f7$, $f4$ and $f5$, $f4$ and $f6$, $f4$ and $f7$. When the count in the counters 102 and 104 reach the values such that logically high signals are applied to the lines 114 and 117 by the decoders 106 and 108 indicating that the frequencies $f4$ and $f7$ for the last code 12 are being generated, the AND gate A5 is enabled so that the next pulse from the pulse generator 58 resets the counters 102 and 104 and is gated through the AND gate A5 to the reset input of the flip-flop F2 to reset the same. The low "1" side output of the flip-flop F2 inhibits the AND gate A3 to terminate feeding pulses from the pulse generator 58 to the scanning unit 60.

At the device 10, the signals from the device 22 are received through the telephone network 16 and applied to the resonator unit 50 through the line coupler 30 and amplifier AMP1. The first pair of frequencies received is $f1$ and $f6$ indicating code 2, and causes the resonators RS1 and RS6 to resonate and apply logically high signals to the AND gates A11, A12, A13, A15 and A21. The AND gate A11 is inhibited since the switch S1 is open and its input from the resonator RS5 is logically low. The AND gate A12 is inhibited since the switch S2 is open even though the inputs from the resonators RS1 and RS6 are both high and the "O" side output of the flip-flop F11 is also high. The outputs of all of the AND gates A11 to A22 are therefore logically low in response to the first set of frequencies $f1$ and $f6$.

The next set of frequencies received is $f1$ and $f7$ indicating code 3, causing the resonators RS1 and RS7 to produce high outputs. The output of the AND gate A13 is logically high since the switch S3 is closed, the inputs from the resonators $f1$ and $f7$ are high and the "O" side output of the flip-flops F11 and F12 are both high. The high output of the AND gate A13 sets the flip-flop F13 to the logically high state.

The AND gates A14 and A15 will be inhibited in response to the frequencies $f2$ and $f5$, $f2$ and $f6$ indicating codes 4 and 5 respectively since the "O" side output of the flip-flop F13 is logically low and is applied to the inputs of the AND gates A14 and A15. In this manner, the priority detector-decoder unit 52 selects the communication mode (skip scanning combined with simple modulation) indicated by code 3 which is common to both of the devices 10 and 22 and has the highest priority, and sets the flip-flop F13 of the code storage unit 54 to store code 3.

Reception of the frequencies $f2$ and $f7$ indicating code 6 causes the resonators RS2 and RS7 to resonate and feed high outputs to the AND gate A16. The AND gate 16, however, is inhibited since the switch S6 is open. The next set of frequencies received is $f3$ and $f5$ indicating code 7, which causes the resonators RS3 and RS5 to feed high outputs to the AND gate A17. The AND gate A17 applies a high output to the flip-flop F17 to set the same since the switch S7 is closed and the "O" side output of the flip-flop F16 is logically high.

The next frequencies received are $f3$ and $f7$ indicating code 9, which will not cause the flip-flop F19 to be set since S9 is open. The next frequencies received are $f4$ and $f5$ indicating code 10, which cause the resonators RS4 and RS5 to resonate and feed high outputs to the AND gate A20. The flip-flop F20 will be set by the high output of the AND gate A20 since the switch S10 is closed and the "O" side output of the flip-flop F19 is logically high.

The next frequencies $f4$ and $f6$ indicating code 11 will not cause the flip-flop F21 to be set since switch S11 is open.

The last set of frequencies $f4$ and $f7$ indicating the end of code transmission will cause the flip-flop F22 to be set.

In the manner described, the flip-flops F13, F17, F20 and F22 are set. The outputs of the flip-flops F13, F17 and F20 indicating codes 3, 7 and 10 are applied through the lines 100 to the transceiver 32 to close the relay contacts R6 and R11 to energize or otherwise select the processor 80 for skip scanning combined with simple modulation operation. The codes 7 and 10 set the transceiver 32 to operate at a line density of 4 lines/mm using A-4 size paper, although the control circuitry is not shown for simplicity of illustration.

The "O" side output of the flip-flop F22 becomes logically low and is applied to the inverting input of the AND gate A4 to enable the same since the other input is connected to the "1" side output of the flip-flop F3 which is logically high. The high output of the AND gate A4 is gated through the OR gate O1 to set the flip-flop F2 to the high state. The low "O" side output of the flip-flop F2 inhibits the AND gates A11 to A22. The high "1" side output of the flip-flop F2 enables the transmission mode AND gate A2 since its other input is connected to the "1" side output of the flip-flop F3 which is logically high. The high output of the AND gate A2 is applied through the line 120 to enable the AND gates A50 to A56 of the selector unit 44 and connect the encoder 56 to the oscillator unit 46. The low output of the AND gate A1 inhibits the AND gates A57 to A63 to disconnect the encoder 42 from the oscillator unit 46. The high "1" side output of the flip-flop F2 enables the AND gate A3 to gate pulses from the pulse generator 58 to the scanning unit 60. The scanning unit 60 sequentially enables the AND gates A31 to A42 in the manner described above so that the OR gates O11 to O17 will produce outputs which control the oscillators OS1 to OS7 by means of the gates G1 to G7 to generate the frequencies $f1$ and $f7$, $f3$ and $f5$, $f4$ and $f5$, $f4$ and $f7$ which are fed to the line coupler 30 through the combiner 48 and amplifier AMP2. These frequencies correspond to the codes 3, 7, 10 and 12 indicating the selected communication mode common to both of the devices 10 and 22. These frequencies are transmitted to the device 22. As the signals on the lines 114 and 117 become logically high, the next pulse is gated through the AND gate A5 to reset the flip-flop F2 and terminate feeding of pulses to the scanning unit 60 from the pulse generator 58.

At the device 22, the frequencies representing the codes 3, 7, 10 and 12 are received from the device 10. Since the flip-flop F2 is reset and its "O" side output is logically high, the AND gates A11 to A22 of the unit 52 are enabled. The received frequencies cause the resonators RS1 to RS7 in the resonator unit 50 to resonate and set the flip-flops F13, F17, F20 and F22. The low "O" side output of the flip-flop F22 has no effect in this case since the "O" side output of the flip-flop F3 is low and the AND gate A4 is inhibited. The high "1" side outputs of the flip-flops F13, F17 and F20 set the transceiver 32 to operate in the selected common communication mode in the same manner as described with reference to the device 10. Thus, both of the devices 10 and 22 are automatically set to operate in the selected common communication mode. Since the priority is determined by the device 10, the unit 52 in the device 22 serves only as a decoder.

Subsequently, means not shown in the device 22, which may be actuated by the flip-flop F22, sends a ready for transmission signal to the device 10 which, in response, transmits graphic information to the device 22 in the selected communication mode. At the end of information transmission, the device 10 generates an end of transmission signal which is applied to its own END terminal to reset the flip-flops F1, F3, and F11 to F22 and transmits the end of transmission signal to the device 22 to perform the same function. Means (not shown) in the devices 10 and 22 then open the respective relay contacts R2 to disconnect the devices 10 and 22 from the telephone network 16.

Many modifications to the embodiment of the present invention shown and described will be readily apparent to those skilled in the art. For example, the code transmission functions of the transmitting and receiving devices may be reversed. In such a system, the transmitting device would establish communication with the receiving device and then transmit to the receiving device the codes representing the communication modes in which the transmitting device is operable. The receiving device would then select the common transmission mode and send to the transmitting device the codes representing the selected communication mode by which both devices would be set to the selected communication mode. The device which selects the communication mode may set itself to the selected communication mode before, at the same time or after sending the code to the other device. It is also possible to transmit the codes in many other forms than pairs of high and low group frequencies. For example, the codes may be transmitted in the form of groups of pulses. The code transmission end pulse (code 12) is optional, and may be replaced by other methods of determining the end of code transmission such as time supervision.

The communication modes and priority arrangement disclosed herein are exemplary only, serving to clearly illustrate the novel principles of the present invention. It will also be noted that it is not necessary to depress switches corresponding to all of the communication modes in which a facsimile device is operable. It may be desirable not to use various modes due to high operating costs or other reasons. In the facsimile device shown, it might be desirable not to depress the switch for code 6 (line density 2.7 lines/mm) even if the device is capable of operating at this line density since it might not be desirable to transmit with such low resolution in consideration of the documents intended for reproduction.

What is claimed is:

1. In a facsimile system including first and second facsimile devices, each device having a facsimile transceiver operable in a plurality of communication modes, at least one of the communication modes being common to the transceivers of the first and second devices, the combination with the facsimile transceiver of each of the first and second facsimile devices of:

first code storage means to store a code indicating the communication modes in which the transceiver of the respective facsimile device is operable;

code sending means to send codes representing communications modes to the other of the first and second facsimile devices;

second code storage means to store a code indicating a selected communication mode constituting one of the at least one of the communication modes common to the first and second facsimile devices, the respective transceiver being connected to the second code storage means to be set thereby to operate in the selected communication mode;

switch means to selectably connect one of the first and second code storage means to the code sending means;

priority sensing means to receive the code indicating the communication mode in which the transceiver of the other of the first and second facsimile devices is operable from the other facsimile device and feed to the second code storage means a code indicating the selected communication mode which is selected in accordance with a predetermined priority arrangement set into the priority sensing means; and control means to control the respective transceiver, switch means and code sending means in such a manner that:

the control means of the first facsimile device controls the switch means thereof to connect the first code storage means to the code sending means and controls the code sending means to send to the second facsimile device the code indicating the communication modes in which the first facsimile device is operable;

the priority sensing means of the second facsimile device receives from the first facsimile device the code indicating the communication modes in which the first facsimile device is operable and feeds to the second code storage means the code representing the selected communication mode to set the transceiver of the second facsimile device to the selected communication mode, the control means controlling the switch means to connect the second code storage means to the code sending means to send the code indicating the selected communication mode to the first facsimile device; and the priority sensing means of the first facsimile device receives from the second facsimile device the code representing the selected communication mode and feeds it to the second code storage means to set the transceiver of the first facsimile device to the selected communication mode.

2. A system according to claim 1, in which each code sending means comprises encoding means and a plurality of oscillators to convert codes indicating communication modes into electromagnetic signals at a plurality of high and low group frequencies, each priority sensing means comprising a plurality of resonant circuits tuned to the high and low group frequencies and decoding means to convert the electromagnetic signals into codes.

3. A system according to claim 2, in which each code sending means further comprises scanning means to scan the codes in the first and second code storage means and sequentially convert code elements indicating individual communication modes into electromagnetic signals each consisting of a high group and a low group frequency,. frequency.

4. A system according to claim 1, in which the communication modes in which the transceivers of the first and second facsimile devices are operable include at least one of simple modulation, three-level analog compression, simple modulation combined with skip scanning, three-level analog compression combined with skip scanning and digital run length encoding, each facsimile transceiver having processing means for each of the respective communication modes in which the transceiver is operable, the processing means corresponding to the selected communication mode being selectively energized by the second code storage means.

* * * * *